US011559958B2

(12) United States Patent
Abell

(10) Patent No.: US 11,559,958 B2
(45) Date of Patent: Jan. 24, 2023

(54) DEGRADABLE FOAM-CONTAINING TIRES, RELATED METHODS AND KITS FOR ADDING DEGRADABLE FOAM TO TIRES

(71) Applicant: Bridgestone Americas Tire Operations, LLC, Nashville, TN (US)

(72) Inventor: Joshua P. Abell, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 712 days.

(21) Appl. No.: 15/746,809

(22) PCT Filed: Jul. 18, 2016

(86) PCT No.: PCT/US2016/042762
§ 371 (c)(1),
(2) Date: Jan. 23, 2018

(87) PCT Pub. No.: WO2017/015196
PCT Pub. Date: Jan. 26, 2017

(65) Prior Publication Data
US 2020/0079039 A1    Mar. 12, 2020

Related U.S. Application Data

(60) Provisional application No. 62/196,102, filed on Jul. 23, 2015.

(51) Int. Cl.
| | | |
|---|---|---|
| *B60C 17/04* | (2006.01) | |
| *B29D 30/04* | (2006.01) | |
| *C08G 18/61* | (2006.01) | |
| *B29C 73/16* | (2006.01) | |
| *B60C 5/00* | (2006.01) | |
| *C08G 18/40* | (2006.01) | |
| *C08G 18/48* | (2006.01) | |
| *C08G 18/76* | (2006.01) | |
| *C08J 9/04* | (2006.01) | |
| *B29K 75/00* | (2006.01) | |
| *B29K 105/04* | (2006.01) | |
| *B29L 30/00* | (2006.01) | |
| *C08G 101/00* | (2006.01) | |
| *B60C 17/06* | (2006.01) | |

(52) U.S. Cl.
CPC ............ *B29C 73/163* (2013.01); *B29D 30/04* (2013.01); *B60C 5/002* (2013.01); *C08G 18/4009* (2013.01); *C08G 18/4837* (2013.01); *C08G 18/61* (2013.01); *C08G 18/7614* (2013.01); *C08J 9/04* (2013.01); *B29K 2075/00* (2013.01); *B29K 2105/04* (2013.01); *B29K 2995/0059* (2013.01); *B29L 2030/00* (2013.01); *B60C 17/065* (2013.01); *C08G 2101/00* (2013.01); *C08J 2201/022* (2013.01); *C08J 2375/08* (2013.01)

(58) Field of Classification Search
CPC ....... B60C 5/002; B60C 17/04; B60C 17/065; B60C 17/0065; B60C 7/105; B60C 17/65; B29D 30/04; C08G 18/61
See application file for complete search history.

(56) References Cited

U.S. PATENT DOCUMENTS

| | | | |
|---|---|---|---|
| 3,246,048 A | 4/1966 | Haluska | |
| 3,519,579 A | 7/1970 | Pepe et al. | |
| 3,814,158 A * | 6/1974 | Ryder | .......... B60C 19/003 |
| | | | 152/158 |
| 3,976,676 A | 8/1976 | Lohse et al. | |
| 4,169,915 A * | 10/1979 | Heitmann | ............. C08J 9/0066 |
| | | | 521/122 |
| 4,267,078 A * | 5/1981 | Lidy | ......... C08J 11/22 |
| | | | 521/49 |
| 4,357,255 A * | 11/1982 | Stemmler | ............. C08G 18/70 |
| | | | 560/345 |
| 4,480,009 A * | 10/1984 | Berger | ................. C07F 7/0889 |
| | | | 427/387 |
| 5,034,427 A * | 7/1991 | Frigo | ................... C08G 18/503 |
| | | | 521/163 |
| 5,061,774 A | 10/1991 | Park et al. | |
| 5,070,138 A * | 12/1991 | Bulluck | ............... C08G 18/302 |
| | | | 524/871 |
| 5,605,657 A | 2/1997 | Nybakken et al. | |
| 5,614,564 A | 3/1997 | Hwang et al. | |

(Continued)

FOREIGN PATENT DOCUMENTS

| | | |
|---|---|---|
| CA | 2057668 A1 | 6/1993 |
| CA | 2643702 A1 | 5/2010 |

(Continued)

OTHER PUBLICATIONS https://www.sigmaaldrich.com/US/en/product/aldrich/481939, no date.*
International Search Report and Written Opinion from PCT application No. PCT/US16/42762, dated Feb. 8, 2017.
Chen et al., "Preparation of Bio-Degradable Polyurethane Foams from Liquefied Wheat Straw," Advanced Materials Research, pp. 1239-1244 (2011)—abstract only submitted.
Rhodes et al., "Inflammatory Response to a Novel Series of Siloxane-Crosslinked Polyurethane Elastomers Having Controlled Biodegradation," Journal of Materials Science: Materials in Medicine, vol. 16, No. 12, pp. 1207-1211 (2005).
Taikum et al., "The Last 100 Years of Fumed Silica in Rubber Reinforcement," Rubber World, vol. 242, No. 5, pp. 35-44 (2010).

(Continued)

*Primary Examiner* — Justin R Fischer
(74) *Attorney, Agent, or Firm* — Meredith E. Hooker; Jenny L. Sheaffer

(57) ABSTRACT

Disclosed herein are kits for use in adding degradable foam to a tire, methods for preparing a degradable foam-containing tire, tires containing degradable foam, and methods for degrading the degradable foam in tires containing degradable foam. The degradable foam comprises a combination of (i) at least one di- or polyisocyanate, (ii) at least one polysiloxane diol, at least one polysiloxane diamine, or a combination thereof, and (iii) optionally at least one polyol.

20 Claims, No Drawings

(56) References Cited

U.S. PATENT DOCUMENTS

| | | | |
|---|---|---|---|
| 6,627,724 B2 | 9/2003 | Meijs et al. | |
| 6,723,771 B2 | 4/2004 | Palinkas et al. | |
| 8,889,788 B2 | 11/2014 | Tuerk et al. | |
| 8,946,372 B2 | 2/2015 | Richter et al. | |
| 9,969,837 B2 * | 5/2018 | Duggal | C08G 18/18 |
| 2004/0154718 A1 | 8/2004 | Doesburg | |
| 2009/0043000 A1 | 2/2009 | Nascimento et al. | |
| 2013/0035407 A1 | 2/2013 | Lobert et al. | |
| 2015/0151592 A1 * | 6/2015 | Parfondry | C08G 18/3206 152/450 |
| 2016/0152739 A1 | 6/2016 | Eilbracht et al. | |

FOREIGN PATENT DOCUMENTS

| | | | |
|---|---|---|---|
| CN | 101280049 B1 | | 4/2010 |
| CN | 101775206 B1 | | 7/2010 |
| CN | 101245130 B1 | | 9/2010 |
| CN | 101891875 A | | 11/2010 |
| CN | 102093702 A | | 6/2011 |
| CN | 103992412 A | | 8/2014 |
| EP | 969967 B1 | | 10/2003 |
| EP | 2009037 A2 | | 12/2008 |
| GB | 2447460 | * | 9/2008 |
| JP | H03-109442 A | | 5/1991 |
| JP | 8-332805 | * | 12/1996 |
| JP | 11-28905 | * | 2/1999 |
| JP | H11-292951 A | | 10/1999 |
| JP | 2004-114849 | * | 4/2004 |
| JP | 2006-159680 | * | 6/2006 |
| JP | 2006-264637 A | | 10/2006 |
| JP | 2013-023547 A | | 2/2013 |
| JP | 2013-52492 | * | 3/2013 |
| JP | 2013-052492 A | | 3/2013 |
| KR | 2004-0024064 A | | 3/2004 |
| WO | 2014-058857 A1 | | 4/2014 |
| WO | 2014-202339 A1 | | 12/2014 |

OTHER PUBLICATIONS

Wen et al., "Study of thermal stability and degradation kinetics of siloxane-containing polyurethanes," Polymeric Materials Science and Engineering, vol. 24, No. 1, pp. 59-62 (2008)—abstract only submitted.

Rhodes et al., "Degradation of a series of polymers of polyurethane crosslinked with silicone in vivo," 7th World Biomaterials Congress, p. 49 (2004)—abstract only submitted.

Ward et al., "In vivo biostability of polysiloxane polyether polyurethanes: Resistance to metal ion oxidation," Journal of Biomedical Materials Research—Part A, vol. 77, No. 2, pp. 380-389 (2006).

Bruice, Paula Yurkanis, Organic Chemistry, pp. 994-995 (1995).

Furniss et al., Vogel's Textbook of Practical Organic Chemistry, 5th edition, pp. 552-553 (1989).

Greene et al., Protective Groups in Organic Synthesis, 2nd edition, pp. 68-79 (1991).

* cited by examiner

DEGRADABLE FOAM-CONTAINING TIRES, RELATED METHODS AND KITS FOR ADDING DEGRADABLE FOAM TO TIRES

FIELD

The present application is directed to kits for use in adding degradable foam to a tire, methods for preparing a degradable foam-containing tire, tires containing degradable foam, and methods for degrading the degradable foam in tires containing degradable foam.

BACKGROUND

The addition of polyurethane foam to pneumatic tires can provide certain advantages such as improved tread wear and elimination of flat tires from punctures. However, the presence of the polyurethane foam inside the tire presents certain challenges when the foam-filled tire reaches the end of its life and needs to be separated from the wheel.

SUMMARY

Disclosed herein are kits for use in adding degradable foam to a tire, methods for preparing a degradable foam-containing tire, tires containing degradable foam, and methods for degrading the degradable foam in tires containing degradable foam.

In a first embodiment, a kit for use in adding degradable foam to a tire is provided. The kit comprises (a) a first component comprising at least one di- or polyisocyanate, and (b) a second component comprising (i) at least one polysiloxane diol, at least one polysiloxane diamine, or a combination thereof, and (ii) optionally at least one polyol.

In a second embodiment, a method for preparing a degradable foam-containing tire is provided. The method comprises (a) providing a tire comprising at least a wheel, a rubber carcass, and a valve stem; (b) combining ingredients comprising: (i) at least one di- or polyisocyanate, (ii) at least one polysiloxane diol, at least one polysiloxane diamine, or a combination thereof, and (iii) optionally at least one polyol; and (c) adding the combined ingredients into the rubber carcass through the valve stem, whereby the added combined ingredients form a degradable foam-containing tire comprising foam that is capable of degradation upon contact with a source of fluoride anion.

In a third embodiment, a tire containing degradable foam is provided. The tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass, wherein the degradable foam is capable of degradation upon contact with a source of fluoride anion.

In a fourth embodiment a method for degrading the degradable foam of a tire containing degradable foam is provided. The tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass. The method comprises contacting the degradable foam with a solution comprising either: (a) a source of fluoride anion, or (b) an organic acid having a pKa of less than 2, an inorganic acid having a pKa of less than 2, or a combination thereof and optionally a solvent for the acid.

DETAILED DESCRIPTION

Disclosed herein are kits for use in adding degradable foam to a tire, methods for preparing a degradable foam-containing tire, tires containing degradable foam, and methods for degrading the degradable foam in tires containing degradable foam.

In a first embodiment, a kit for use in adding degradable foam to a tire is provided. The kit comprises (a) a first component comprising at least one di- or polyisocyanate, and (b) a second component comprising (i) at least one polysiloxane diol, at least one polysiloxane diamine, or a combination thereof, and (ii) optionally at least one polyol.

In a second embodiment, a method for preparing a degradable foam-containing tire is provided. The method comprises (a) providing a tire comprising at least a wheel, a rubber carcass, and a valve stem; (b) combining ingredients comprising: (i) at least one di- or polyisocyanate, (ii) at least one polysiloxane diol, at least one polysiloxane diamine, or a combination thereof, and (iii) optionally at least one polyol; and (c) adding the combined ingredients into the rubber carcass through the valve stem, whereby the added combined ingredients form a degradable foam-containing tire comprising foam that is capable of degradation upon contact with a source of fluoride anion.

In a third embodiment, a tire containing degradable foam is provided. The tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass, wherein the degradable foam is capable of degradation upon contact with a source of fluoride anion.

In a fourth embodiment a method for degrading the degradable foam of a tire containing degradable foam is provided. The tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass. The method comprises contacting the degradable foam with a solution comprising either: (a) a source of fluoride anion, or (b) an organic acid having a pKa of less than 2, an inorganic acid having a pKa of less than 2, or a combination thereof and optionally a solvent for the acid.

Definitions

The terminology as set forth herein is for description of the embodiments only and should not be construed as limiting the invention as a whole.

As used herein, the terms "degrade," "degraded," and "degrading" (e.g., degrading the foam or degraded foam) is intended to encompass entirely changing the degradable foam inside the rubber carcass from a solid into a pourable liquid as well as changing a portion of the degradable foam inside the rubber carcass from a solid into a pourable liquid.

In other words, these terms should be understood to encompass changing a sufficient portion of the foam inside the rubber carcass from a solid into a pourable liquid to achieve separation of the wheel from the rubber carcass and the foam. Degrading of the entire volume of foam from a solid into a pourable liquid is not necessarily required to achieve the separation. Moreover, a pourable liquid may include pieces or chunks of undegraded polyurethane foam. As non-limiting examples, ice water would be considered a pourable liquid whereas mayonnaise at 5° C. would not be considered a pourable liquid.

As used herein, the term "majority" is used to describe an amount of more than 50% and the related term "at least a majority" is used to describe an amount of more than 50% up to 100%. Additionally, the terms should be understood to include all values within the range of greater than 50% to 100% (e.g., at least 55%, at least 60%, at least 65%, at least 70%, at least 75%, at least 80%, at least 85%, at least 90%, at least 95%, at least 98%, and at least 99%).

As used herein, the term "mounted" (i.e., mounted tire) is used to describe a tire that is connected to a wheel, the connection may be, but is not necessarily, sufficient for use of the mounted tire on a vehicle.

Kits for Use in Adding Degradable Foam to a Tire

As discussed above, according to the first embodiment disclosed herein, a kit for use in adding degradable foam to a tire is provided. In certain embodiments of the first embodiment, the tire for which the kit is intended to be used with is a pneumatic tire. According to the first embodiment, the kit comprises a first component comprising at least one di- or polyisocyanate, and a second component comprising at least one polysiloxane diol, at least one polysiloxane diamine, or a combination thereof; and optionally at least one polyol. As to the first component, by specifying that it comprises at least one di- or polyisocyanate it should be understood to include embodiments wherein the first component comprises one diisocyanate, more than one diisocyanate, one polyisocyanate, more than one polyisocyanate, one diisocyanate and one polyisocyanate, more than one diisocyanate and one polyisocyanate, more than one diisocyanate and more than one polyisocyanate, and one diisocyanate and more than one polyisocyanate. According to the first embodiment, the first and second components are provided in separate containers; by separate is meant that the respective components are not in contact with each other. Moreover, the separate containers for the first and second components may have the same shape, same size, be made of the same materials, be different shapes, be different sizes, be made of different materials or combinations thereof. The separate containers may take various forms that are not particularly limited as long as they serve to contain their contents and maintain them separately until such time as their combination is required. For example, in certain embodiments of the first embodiment, the separate containers may independently be selected from at least one of the following: a bottle, a tube, a carton, a packet, a drum, or a can.

In certain embodiments of the first embodiment, the first component of the kit includes at least one additional ingredient, i.e., in addition to the at least one di- or polyisocyanate. In certain such embodiments, the first component of the kit further comprises at least one of the following: at least one oil (e.g., hydrocarbon, mineral, or plant oil), one or more fillers (e.g., carbon black, silica, fiberglass), rubber particles, one or more stabilizers (e.g., anti-oxidants, UV stabilizers), one or more plasticizers, one or more catalysts (as discussed below), or at least one foaming agent. In certain embodiments of the first embodiment, the first component of the kit further comprises at least one oil.

In certain embodiments of the first embodiment, the kit further comprises at least one foaming agent. The at least one foaming agent may be included as part of the first or second component or in a container separate from the containers of the first and second components. Suitable foaming agents for use in forming the degradable foam are well known to those of skill in the art, non-limiting examples and amounts of which are discussed below. When the at least one foaming agent is provided in a container separate from the containers of the first and second components, the particular container used is not especially limited and containers as discussed above for the first and second components may be utilized.

In certain embodiments of the first embodiment, the kit further comprises a third component comprising a source of fluoride anion useful for degrading a foam formed from the first and second components. Various sources of fluoride anion may be utilized, as discussed below. The particular container used for the third component is not especially limited and containers as discussed above for the first and second components may be utilized.

In certain embodiments, the kit may comprise at least four components, i.e., the first component, the second component, a third component (comprising a source of fluoride anion), and another component (comprising at least one of the additional ingredients discussed above).

Methods for Preparing Degradable Foam-Containing Tires

As discussed above, the second embodiment disclosed herein is directed to a method for preparing a degradable foam-containing tire. The method comprises (a) providing a tire comprising at least a wheel, a rubber carcass, and a valve stem; (b) combining ingredients comprising: (i) at least one di- or polyisocyanate, (ii) at least one polysiloxane diol, at least one polysiloxane diamine, or a combination thereof, and (iii) optionally at least one polyol; and (c) adding the combined ingredients into the rubber carcass through the valve stem, whereby the added combined ingredients form a degradable foam-containing tire comprising foam that is capable of degradation upon contact with a source of fluoride anion. In certain embodiments of the second embodiment, the ingredients combined in (b) further comprise at least one additional ingredient, i.e., in addition to the at least one di- or polyisocyanate. In certain such embodiments, the at least one additional ingredient comprises at least one of the following: at least one oil (e.g., hydrocarbon, mineral, or plant oil), one or more fillers (e.g., carbon black, silica, fiberglass), rubber particles, one or more stabilizers (e.g., anti-oxidants, UV stabilizers), one or more plasticizers, one or more catalysts (as discussed below), or at least one foaming agent. In certain embodiments of the second embodiment, the ingredients combined in (b) further comprise at least one oil. In certain embodiments of the second embodiment, ingredients (i), (ii) and optionally (iii) are combined within the tire, i.e., they are not pre-mixed prior to being added through the valve stem of the tire.

In certain embodiments of the second embodiment, the ingredients combined in (b) further comprise at least one foaming agent. Suitable foaming agents for use in forming the degradable foam are well known to those of skill in the art, non-limiting examples and amounts of which are discussed below.

The methods of the second embodiment may be, but are not necessarily, utilized with the kits of the first embodiment disclosed herein.

Tires Containing Degradable Foam

As discussed above, the third embodiment disclosed herein is directed to a tire containing degradable foam. The tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass, wherein the degradable foam is capable of degradation upon contact with a source of fluoride anion. In certain embodiments, the tire is a pneumatic tire that has had at least a majority of its air replaced with degradable foam.

The tires of the third embodiment may be prepared using the methods of the second embodiment or by methods that differ from the methods of the second embodiment. The methods of the second embodiment may be utilized to produce tires according to the third embodiment or alternatively may be utilized to produce tires that differ in certain aspects from the tires according to the third embodiment.

Methods for Degrading Degradable Foam of Degradable Foam-Containing Tires

As discussed above, the fourth embodiment disclosed herein is directed to methods for degrading the degradable foam of degradable foam-containing tires. The degradable foam-containing tire comprises a wheel, a rubber carcass comprising at least a tread portion and a sidewall portion, and optionally a valve stem; and degradable foam comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass. The method comprises contacting the degradable foam with a solution comprising either: (a) a source of fluoride anion, or (b) an organic acid having a pKa of less than 2, an inorganic acid having a pKa of less than 2, or a combination thereof and optionally a solvent for the acid. The solution is also described herein as a degradant.

The amount of solution applied to the degradable foam inside the rubber carcass may vary depending upon various factors such as the particular type of solution utilized, the particular composition of the degradable foam, the overall volume of degradable foam inside the tire carcass, the dimensions of the tire (e.g., overall tire diameter, sidewall height, tread width), and the time available for the degradation of the foam to occur. Generally, larger volumes of foam will require larger volumes of solution and relatively larger tires (particularly those having higher sidewall height or wider tread width) may require relatively larger ratios of solution to foam to achieve the same approximate time for degradation.

In certain embodiments of the first-third embodiments disclosed herein, the solution is applied to the degradable foam inside the rubber carcass in an amount sufficient to provide fluoride anion in an amount of about 1% to about 100% (on a volume of source of fluoride anion to volume of degradable foam basis) or 1% to 100%. In certain embodiments of the fourth embodiment, the solution is applied to the degradable foam inside the rubber carcass in an amount sufficient to provide fluoride anion in an amount of about 5% to about 100% (on a volume of source of fluoride anion to volume of degradable foam basis), including 5% to 100%, about 5% to about 90%, 5% to 90%, about 5% to about 80%, 5% to 80%, about 5% to about 70%, 5% to 70%, about 5% to about 60%, 5% to 60%, about 5% to about 50%, 5% to 50%, about 5% to about 40%, 5% to 40%, about 5% to about 30%, 5% to 30%, about 5% to about 20%, 5% to 20%, about 5% to about 15%, 5% to 15%, about 1% to about 20%, 1% to 20%, about 1% to about 15%, 1% to 15%, about 1% to about 10%, and 1% to 10%. For purposes of determining the volume of foam inside the rubber carcass, it is intended that the dimensions of the tire can be utilized (e.g., by calculating the volume of a torus having the dimensions of the tire) and the assumption made that the volume inside the rubber carcass is at least 95% filled with foam. The volume ratios provided herein are intended for application by using the density of the solution or the solution ingredients at 25° C. Generally, the greater the relative amount of polysiloxane as compared to polyol present in the foam, the greater the relative amount of fluoride anion that may be used to achieve degradation in the same amount of time.

In certain embodiments of the first-third embodiments disclosed herein, the solution comprising the organic acid having a pKa of less than 2, inorganic acid having a pKa of less than 2, or a combination thereof and optionally a solvent for the acid is applied to the degradable foam inside the rubber carcass in an amount sufficient to provide complete solubility of the acid in an amount of about 1% to about 50% (on a volume of solvent to volume of degradable foam basis) or 1-50%. In certain embodiments of the fourth embodiment, the solution is applied to the degradable foam inside the rubber carcass in an amount sufficient to provide complete solubility of the acid in an amount of about 10% to about 25% (on a volume of solvent to volume of degradable foam basis) or 10-25%.

According to the methods of the fourth embodiment, the step of contacting the degradable foam with the specified solution may take various forms as long as the solution makes contact with the degradable foam. In certain embodiments of the fourth embodiment, the solution is injected into the degradable foam. In certain embodiments of the fourth embodiment, the solution is added through the valve stem, through the sidewall of the tire, through the tread of the tire, or by a combination thereof. In those embodiments where the solution is added through the sidewall of the tire, it may be added at one or more sidewall locations and each location may be cut, punctured, pierced or some combination thereof to facilitate the addition of the solution. As non-limiting examples, the solution may be injected through the sidewall using a needle, nozzle or other injection device, either through the intact sidewall or through a cut, puncture or other opening added for the purpose of facilitating the addition of the solution to the degradable foam. In those embodiments where the solution is added through the tread of the tire, it may be added at one or more tread locations and each location may be cut, punctured, pierced or some combination thereof to facilitate the addition of the solution. As non-limiting examples, the solution may be injected through the tread using a needle, nozzle or other injection device, either through the intact tread or through a cut, puncture or other opening added for the purpose of facilitating the addition of the solution to the degradable foam. In certain embodiments of the fourth embodiment disclosed herein, the foam inside the rubber carcass is at least partially exposed to the outer environment prior to applying the solution. Various methods of partially exposing the polyurethane foam can be utilized, including cutting, puncturing, or piercing the sidewall or tread of the tire. In certain embodiments of the first-third embodiments, the tire is placed on one side and a cut is made (circumferentially) around a portion (preferably at least a majority) of the upper side of the tire exposing the foam inside; in such embodiments, the lower side of the tire can act as a type of container to collect the degraded foam, thereby containing it or eliminating the need for use of another container to collect the degraded foam. The foregoing description of methods for contacting the degradable foam with the degradant or solution should be understood to be applicable to certain embodiments of the first-third embodiments disclosed herein, in addition to the fourth embodiment.

In certain embodiments of the methods of the fourth embodiment, the method comprises contacting the degradable foam with a solution comprising a source of fluoride anion. Various sources of fluoride anion exist and may be utilized in the solution according to the methods of the fourth embodiment. In certain embodiments of the fourth embodiment, the solution comprising a source of fluoride anion comprises hydrogen fluoride, at least one tetraalkylammonium fluoride, cesium fluoride/caesium fluoride, a pyridine salt of hydrogen fluoride, or a combination thereof. Various tetraalkylammonium fluoride compounds are suitable for use as the degradant in certain embodiments of the fourth embodiment and in certain embodiments applicable to the first-third embodiments disclosed herein (e.g., for the third component in kits of the first embodiment). In certain such embodiments, the tetraalkylammonium fluoride has the general formula: $(C_nH_{2n+1})_4N^+F^-$ where n is from 1 to 30, preferably n is from 1 to 18 and more preferably n is from 1 to 12 particular examples of which include, but are not limited to, tetramethylammonium fluoride, tetraethylammonium fluoride, tetrabutylammonium fluoride, tetrapentylammonium fluoride, tetrahexylammonium fluoride, tetraheptylammonium fluoride, tetraoctylammonium fluoride, tetranonylammonium fluoride, tetradecylammonium fluoride, tetraisopropylammonium fluoride, tetraisobutylammonium fluoride, tetra(tert-butyl)ammonium fluoride, tetra(tert-pentyl)ammonium fluoride, and combinations thereof. The preceding discussion of sources of fluoride anion should be understood to be applicable to those embodiments of the first-third embodiments that involve the use of such.

In certain embodiments of the methods of the fourth embodiment, the method comprises contacting the degradable foam with a solution comprising an organic acid having a pKa of less than 2, an inorganic acid having a pKa of less than 2, or a combination thereof, and optionally a solvent for the acid. The pKa values referred to herein are of the acid in water. As used herein the term "organic acid" refers to acids containing carbon and hydrogen and having at least one COOH moiety and the term "inorganic acid" refers to acids lacking carbon. Non-limiting examples of suitable organic and inorganic acids having a pKa of less than 2 for use in the solution include sulfonic acids (e.g., camphorsulfonic acid, p-toluene sulfonic acid, trifluoromethane sulfonic acid, methane sulfonic acid), hydrochloric acid, and hydrobromic acid. As used herein the term "sulfonic acid" refers to an acid having the formula $RS(=O)_2OH$ wherein R is selected from alkyl and aryl (either optionally substituted with one or more halogen). Optionally, the solution comprises at least one solvent capable of dissolving the acid (such as a protic or aprotic solvent).

The methods of the fourth embodiment disclosed herein may be, but are not necessarily, utilized on the tires of the third embodiment disclosed herein.

Di- and Polyisocyanates

As discussed above, according to the embodiments of the first-fourth embodiments disclosed herein, the kits disclosed herein comprise, the degradable foam comprises or is prepared by combining ingredients comprising at least one di- or polyisocyanate. As used herein, the term diisocyanate is used to describe compounds that contain two isocyanate moieties (i.e., two —C(=O)N(H)— moieties) and the term polyisocyanate is used to describe compounds that contain more than two isocyanate moieties. Various compounds suitable for use as the at least one di- or polyisocyanate are well known. In certain embodiments of the first-fourth embodiments disclosed herein, the at least one di- or polyisocyanate is selected from aliphatic di- or polyisocyanates, aromatic di- or polyisocyanates, araliphatic di- or polyisocyanates, cycloaliphatic, di- or polyisocyanates, and combinations thereof. Suitable compounds for each of the foregoing types of di- and polyisocyanates are well known. Non-limiting examples of suitable aromatic diisocyanates include toluene diisocyanate (also known as tolylene diisocyanate or TDI), diphenylmethane diisocyanate (also known as methylenebis(phenyl isocyanate) or MDI), 1,3'-dimethyl-4,4-biphenyl diisocyanate (also known as TODI), 1,4-paraphenylene diisocyanate (also known as PPDI), and 1,5-naphthalene diisocyanate; in certain embodiments of the first-fourth embodiments the at least one di- or polyisocyanate comprises at least one of the foregoing. Commercially available sources of toluene diisocyanate may include one or more of: 2,4-toluene diisocyanate, 2,6-toluene diisocyanate, and combinations thereof. Commercially available sources of MDI may include one or more of 2,2'-, 2,4'-, and 4,4'-diphenylmethane diisocyanate. Non-limiting examples of suitable aliphatic diisocyanates include butane diisocyanate, pentane diisocyanate, hexane diosocyanate, 4-isocyanatomethyl-1, 8-octane diisocyanate (also known as triisocyanatononane or TIN), 1,4-butylene diisocyanate, 1,12-dodecamethylene diisocyanate, 1,10-decamethylene diisocyanate, 2-butyl-2-ethylpentamethylene diisocyanate, 2,4,4-trimethylhexamethylene diisocyanate, 2,2,4-trimethylhexamethylene diisocyanate, and hexamethylene diisocyanate (also known as hexane diisocyanate or HDI); in certain embodiments of the first-fourth embodiments the at least one di- or polyisocyanate comprises at least one of the foregoing. Non-limiting examples of suitable cycloaliphatic diisocyanates include isophorone diisocyanate (IPDI), 2-isocyanatopropylcyclohexyl isocyanate, 2,4'-methylene bis(cyclohexyl) diisocyanate, 4-methylcyclohexane, 4,4'-methylene-bis(cyclohexylisocyanate (also known as hydrogenated MDI or H12 MDI), 3,5,5-trimethyl-1-isocyanato-3-isocyanatomethylcyclohexane (also known as isophorone diisocyanate or IPDI), 1,3- and 1,4-bis(isocyanatomethyl)cyclohexane (also known as ($H_6XDI$), 1,3-diisocyanate (H-TDI); in certain embodiments of the first-fourth embodiments the at least one di- or polyisocyanate comprises at least one of the foregoing. Non-limiting examples of suitable araliphatic di- or polyisocyanates include tetramethylxylylene diisocyanate (also known as TMDXI), m-xylylene diisocyanate, 3,3'-dimethoxy-4,4'-biphenylene diisocyanate, polymeric diphenylmethane diisocyanate, 2,4-diisocyanatodiphenyl sulfide, diethyldiisocyanatobenzene; in certain embodiments of the first-fourth embodiments the at least one di- or polyisocyanate comprises at least one of the foregoing. In certain embodiments of the first-fourth embodiments, the at least one di- or polyisocyanate may comprise a combination of one or more of the foregoing.

Polysiloxane Diols, Polysiloxane Diamines, and Combinations Thereof

As discussed above, according to the embodiments of the first-fourth embodiments disclosed herein, the kits disclosed herein comprise, the degradable foam comprises or is prepared by combining ingredients comprising at least one polysiloxane diol, at least one polysiloxane diamine, or a combination thereof. The use of the phrase at least one polysiloxane diol, at least one polysiloxane diamine, or a combination thereof is meant to encompass embodiments where one polysiloxane diol is used, more than one polysiloxane diol is used, one polysiloxane diamine is used, more than one polysiloxane diamine is used, one polysiloxane diol and one polysiloxane diamine are used, more than one polysiloxane diol and one polysiloxane diamine are used, one polysiloxane diol and more than one polysiloxane diamine are used, and more than one polysiloxane diol and more than one polysiloxane diamine are used. As used herein, the term polysiloxane is used to describe compounds that contain at least three Si each bonded to at least two oxygen.

In certain embodiments of the first-fourth embodiments disclosed herein, the at least one polysiloxane diol, at least one polysiloxane diamine, or a combination thereof comprises at least one polysiloxane diol having the formula

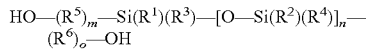
$$HO-(R^5)_m-Si(R^1)(R^3)-[O-Si(R^2)(R^4)]_n-(R^6)_o-OH$$

wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1. In certain embodiments, m and o are both 1 and $R^5$ and $R^6$ are independently selected from optionally substituted straight chain, branched or cyclic, saturated or unsaturated hydrocarbon radicals having 1 to 12 carbons. In certain embodiments, none of $R^1$, $R^2$, $R^3$, $R^4$, $R^5$, and $R^6$ contain any heteroatom. In certain embodiments, each of $R^1$, $R^2$, $R^3$, $R^4$ is independently selected from alkyl hydrocarbons. Examples of straight chain and branched saturated hydrocarbon suitable for use as $R^1$, $R^2$, $R^3$, $R^4$ or a combination thereof include alkyl groups such as methyl, ethyl, propyl, isopropyl, butyl, isobutyl, sec-butyl, tert-butyl, amyl, isoamyl, secamyl, 1,2-dimethylpropyl, 1,1-dimethylpropyl, pentyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-prophylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl 1-, 2-, 3-, 4-, 5-, 6,7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1,2-pentylheptyl and the like. Examples of cyclic saturated hydrocarbons suitable for use as $R^1$, $R^2$, $R^3$, $R^4$, or a combination thereof include cyclopropyl, cyclobutyl, cyclopentyl, cyclohexyl, cycloheptyl, cyclooctyl, cyclononyl and cyclodecyl and the like.

In certain embodiments of the first-fourth embodiments disclosed herein, the at least one polysiloxane diol, at least one polysiloxane diamine, or a combination thereof comprises at least one polysiloxane diamine having the formula

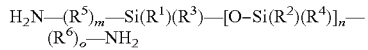
$$H_2N-(R^5)_m-Si(R^1)(R^3)-[O-Si(R^2)(R^4)]_n-(R^6)_o-NH_2$$

wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1. In certain embodiments, m and o are both 1 and $R^5$ and $R^6$ are independently selected from optionally substituted straight chain, branched or cyclic, saturated or unsaturated hydrocarbon radicals having 1 to 12 carbons. In certain embodiments, none of $R^1$, $R^2$, $R^3$, $R^4$, $R^5$, and $R^6$ contain any heteroatom. In certain embodiments, each of $R^1$, $R^2$, $R^3$, $R^4$ is independently selected from alkyl hydrocarbons. Examples of suitable $R^1$, $R^2$, $R^3$, $R^4$ include those discussed above in the section on polysiloxane diols. Various polysiloxane diamines are commercially available from suppliers such as Sigma Aldrich Corporation (St. Louis, Mo.). Non-limiting examples of polysiloxane diamines suitable for use in certain embodiments of the first-fourth embodiments disclosed herein include poly(dimethylsiloxane) diamine, poly(methylphenyl siloxane) diamine, poly(epoxy-modified siloxane) diamine, poly(dimethyl siloxane)co-poly (diphenyl siloxane) diamine, polysiloxane-polyether diamine copolymer, poly(dimethylsiloxane) bis(3-aminopropyl) terminated, and combinations thereof.

Polyols

As discussed above, according to certain embodiments of the first-fourth embodiments disclosed herein, the kits disclosed herein comprise, the degradable foam comprises or is prepared by combining ingredients comprising at least one polyol along with the at least one di- or polyisocyanate, and at least one polysiloxane diol, at least one polysiloxane diamine, or a combination thereof. In other words, the at least one polyol is an optional ingredient in the degradable foam. As used herein, a polyol describes a compound that is reactive with the NC(═O) functionality of the di- or polyisocyanate and that has a mean OH or NH functionality of at least 2. In those embodiments of the first-fourth embodiments disclosed herein when at least one polyol is utilized, the degradable foam that results from the mixture of ingredients can be considered to be a degradable polyurethane foam. In certain embodiments of the first-fourth embodiments when the at least one polyol is utilized it is selected from alkylene polyols, arylene polyols, polyether polyols, polyester polyols, polycarbonate polyols, polybutadiene polyols, polyamines, polyether polyamines, hydrocarbon polyols, and combinations thereof. Non-limiting examples of alkylene polyols and arylene polyols include diols (e.g., 1,2-ethanediol, 1,3-propanediol, 1,2-propanediol, 1,4-butanediol, 1,6-hexanediol, 1,8-octanediol, 1,9-nonandiol, 1,10-decandiol, 1,12-dodecanediol, 1,4-cyclohexane dimethanol, p-xyleneglycol, 1,4-bis (2-hydroxyethoxy) benzene), triols (e.g., glycerol, trimethylolpropane), and tetraols (e.g., pentaerythritol). Non-limiting examples of polyether polyols include those with the formula $HO-[(CH_2)_m-O]_n-H$ wherein m is an integer of 28 or more, preferably 4 to 18 and n is an integer of 2 to 50 including poly(tetramethylene oxide), polyhexamethylene oxide (also known as PHMO), polyheptamethylene diol, polyoctamethylene oxide (POMO), polydecamethylene oxide (PDMO), and combinations thereof. Non-limiting examples of polycarbonate polyols include poly(alkylenecarbonates) such as poly(hexamethylene carbonate) and poly(decamethylene carbonate); polycarbonates prepared by reacting alkylene carbonate with alkanediols for example 1,4-butanediol, 1,10-decandiol, 1,6-hexanediol and/or 2,2-diethyl 1,3-propanediol; and silicon based polycarbonates prepared by reacting alkylene carbonate with 1,3-bis (4-hydroxybutyl)-1,1,3,3-tetramethyldisiloxane (BHTD) and/or alkanediols.

Various polyols suitable for use in certain embodiments of the first-fourth embodiments disclosed herein are commercially available from supplier such as Sigma Aldrich Corporation (St. Louis, Mo.). Moreover, various methods for producing polyols suitable for use in certain embodiments of the first-fourth embodiments disclosed herein are well known. For example, polyether polyols are obtainable by alkoxylation of suitable starter molecules with base catalysis or using double metal cyanide compounds (DMC compounds). Suitable starter molecules for the preparation of polyether polyols are, for example, simple, low molecular weight polyols, water, organic polyamines having at least two N—H bonds or arbitrary mixtures of such starter molecules. Preferred starter molecules for the preparation of polyether polyols by alkoxylation, in particular by the DMC process, are in particular simple polyols such as ethylene glycol, 1,3-propylene glycol and 1,4-butanediol, 1,6-hexanediol, neopentyl glycol, 2-ethyl-1,3-hexanediol, glycerol, trimethylolpropane, pentaerythritol as well as low molecular weight, hydroxyl-group containing esters of such polyols with dicarboxylic acids of the type mentioned by way of example below or low molecular weight ethoxylation or propoxylation products of such simple polyols or arbitrary mixtures of such modified or unmodified alcohols. Alkylene oxides suitable for the alkoxylation are in particular ethylene oxide and/or propylene oxide, which can be used in the alkoxylation in any desired sequence or also in admixture. Polyester polyols can be prepared by polycondensation of low molecular weight polycarboxylic acid derivatives, such as, for example, succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid, trimer fatty acid, phthalic acid, phthalic anhydride, isophthalic acid, terephthalic acid, citric acid or trimellitic acid, with low molecular weight polyols, such as, for example, ethylene glycol, diethylene glycol, neopentyl glycol, hexanediol, butanediol, propylene glycol, glycerol, trimethylolpropane, 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol, or by ring-opening polymerization of cyclic carboxylic acid esters, such as E-caprolactone. In addition, hydroxycarboxylic acid derivatives, such as, for example, lactic acid, cinnamic acid or w-hydroxycaproic acid, can also be polycondensed to polyester polyols. However, polyester polyols of oleochemical origin can also be used. Such polyester polyols can be prepared, for example, by complete ring opening of epoxidized triglycerides of an at least partially olefinically unsaturated fatty-acid-containing fatty mixture with one or more alcohols having from 1 to 12 carbon atoms and by subsequent partial transesterification of the triglyceride derivatives to alkylester polyols having from 1 to 12 carbon atoms in the alkyl radical. Polyacrylate polyols can be prepared by radical polymerization of hydroxyl-group-containing, olefinically unsaturated monomers or by radical copolymerization of hydroxyl-group-containing, olefinically unsaturated monomers with optionally other olefinically unsaturated monomers, such as, for example, ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl-group-containing, olefinically unsaturated monomers include 2-hydroxyethylacrylate, 2-hydroxyethyl methacrylate, the hydroxypropyl acrylate isomer mixture obtainable by addition of propylene oxide to acrylic acid, and the hydroxypropylmethacrylate isomer mixture obtainable by addition of propylene oxide to methacrylic acid. Suitable radical initiators are those from the group of the azo compounds, such as, for example, azoisobutyronitrile (AIBN), or from the group of the peroxides, such as, for example, di-tert-butyl peroxide.

Amounts of Di- or Polyisocyanate(s); Polysiloxane(s); and Polyol(s)

As discussed above, according to the first-fourth embodiments disclosed herein, the kits disclosed herein comprise, the degradable foam comprises or is prepared by combining ingredients comprising (i) at least one di- or polyisocyanate; (ii) at least one polysiloxane diol, at least one polysiloxane diamine, or a combination thereof; and (iii) optionally at least one polyol. Varying amounts of each component can be utilized.

In those embodiments where the at least one polyol is present, it can be utilized in varying amounts. In certain embodiments of the first-fourth embodiments disclosed herein, the polyol is present and it comprises about 1 to about 95% by volume of the total combined volume of the at least one polyol and at least one polysiloxane diol, at least one polysiloxane diamine, or a combination thereof. In certain embodiments of the first-fourth embodiments disclosed herein, the at least one polyol is present and it comprises about 1 to about 95% by weight of the total combined amount (by weight) of the at least one polyol and at least one polysiloxane diol, at least one polysiloxane diamine, or a combination thereof. In certain embodiments of the first-fourth embodiments disclosed herein, the at least one polyol is present and it comprises about 1 to about 95%, 1 to 95%, about 1 to about 75%, 1 to 75%, about 1 to about 50%, 1 to 50%, about 5 to about 95%, 5 to 95%, about 5 to about 75%, 5 to 75%, about 5 to about 50%, 5 to 50%, about 10 to about 95%, 10 to 95%, about 10 to about 75%, 10 to 75%, about 10 about 50%, 10 to 50%, about 10 to about 40%, 10 to 40%, about 10 to about 25%, 10 to 25%, about 15 to about 95%, 15 to 95%, about 15 to about 75%, 15 to 75%, about 15 to about 50%, 15 to 50%, about 15 to about 40%, 15 to 40%, about 15 to about 25%, or 15 to 25%, each amount by weight of the total combined amount (by weight) of the at least one polyol and at least one polysiloxane diol, at least one polysiloxane diamine, or a combination thereof. As a non-limiting example, an amount of about 15 to about 25% by weight of the at least one polyol would be met by the use of 85 parts by weight of the at least one polysiloxane diol, at least one polysiloxane diamine, or a combination thereof with 15 parts by weight of the at least one polyol, and also by the use of 75 parts by weight of the at least one polysiloxane diol, at least one polysiloxane diamine, or a combination thereof with 25 parts by weight of the at least one polyol, respectively. In certain embodiments of the first-fourth embodiments disclosed herein, the at least one polyol is present and comprises a majority by weight of the total combined amount (by weight) of the at least one polyol and at least one polysiloxane diol, at least one polysiloxane diamine, or a combination thereof. In certain embodiments of the first embodiment, the second component of the kit comprises about 1 to about 50%, 1 to 50%, about 15 to about 25%, or 15% to 25% by weight of the at least one polyol, based upon the combined total weight of at least one polyol and at least one polysiloxane diol, at least one polysiloxane diamine, or a combination thereof.

For purposes of the following discussion, the first component should be understood as including the at least one di- or polyisocyanate and the second component should be understood as including the at least one polysiloxane diol, at least one polysiloxane diamine, or a combination thereof as well as any polyol that is utilized. According to the first-fourth embodiments, the relative amount of the first component and second component contained in the degradable foam, in the kit, or used to prepare the degradable foam can vary widely. In certain embodiments of the first-fourth embodiments disclosed herein, the ratio of the first component to the second component is from greater than 1:1 up to about 4:1, including up to 4:1, about 1.2:1 to about 4:1, 1.2:1 to 4:1, about 1.5:1 to about 4:1, 1.5:1 to 4:1, about 2:1 to about 4:1, 2:1 to 4:1, about 1.5:1 to about 3:1, 1.5:1 to 3:1, about 2:1 to about 3:1, and 2:1 to 3:1. As those of skill in the art will understand, the ratio of the first component to second component can be varied depending upon the ultimate use for the foam-filled tire with relatively higher amounts of the first component (di- or polyisocyanate) producing a foam that is relatively less compressible.

Foaming Agent

In certain embodiments of the first-fourth embodiments, a foaming agent will be included in the ingredients of the kit, ingredients of the foam or ingredients used to prepare the foam. In certain embodiments of the first-fourth embodiments, the foaming agent comprises water which is present in a sufficient amount in one or more of the other ingredients (e.g., at least one polyol) that no separate foaming agent need be added. In other embodiments of the first-fourth embodiments, a separate foaming agent is utilized and it can be combined with the at least one di- or polyisocyanate (e.g., present in the first component of the first embodiment), with the at least one polysiloxane diol, at least one polysiloxane diamine, or a combination thereof and the optional at least one polyol (e.g., present in the second component of the first embodiment). Alternatively, according to certain embodiments of the first embodiment, the foaming agent does not comprise part of the kit but is added to the components of the kit at the time of addition of the degradable foam into the pneumatic tire. Various foaming agents suitable for use in preparing foams including polyurethane foams are well known. Non-limiting examples of suitable foaming agents for use in those embodiments of the first-fourth embodiments that utilize a foaming agent include water, hydrocarbons (e.g., propane, butane, pentane), halocarbons (e.g., fluorocarbons, chlorofluorocarbons), air, carbon dioxide, azodicarbonamide, and combinations thereof. In literature relating to production of foams such as polyurethane foams, foaming agents are often referred to as blowing agents, and, thus, blowing agents known to be useful for producing polyurethane foams can be utilized as the foaming agent in certain embodiments of the first-fourth embodiments disclosed herein. The amount of foaming agent utilized is a relatively minor amount such as no more than 5%, no more than 3%, no more than 1% by weight of the total amount of di- or polyisocyanate; at least one polysiloxane diol, at least one polysiloxane diamine, or a combination thereof; and any polyol.

Catalyst(s)

In certain embodiments of the first-fourth embodiments, at least one catalyst is included in the ingredients of the kit, ingredients of the foam or ingredients used to prepare the foam. Catalysts for use in preparing foams such as polyurethane foams are well known. Suitable catalysts for use in those embodiments of the first-fourth embodiments where at least one catalyst is utilized include, but are not limited to, catalysts typically used in polyurethane production. Non-limiting examples of suitable catalysts for use in those embodiments of the first-fourth embodiments where at least one catalyst is utilized include organic amines (e.g., tertiary aliphatic amines, cycloaliphatic amines, aromatic amines) and Lewis-acid organic metal compounds (e.g., tin compounds such as tin(II) salts of organic carboxylic acids, metal complexes such as acetyl acetonates of iron, titanium, zinc, aluminum, zirconium, manganese, nickel, and cobalt, zinc carboxylates, cesium carboxylates, cobalt carboxylates). In those embodiments of the first-fourth embodiments where at least one catalyst is utilized varying amounts can be utilized; in certain such embodiments, the amount of at least one catalyst is 0.0001% to 10% by weight, including 0.001 to 5% by weight based upon the total amount (by weight) of di- or polyisocyanate.

Degrading of the Degradable Foam

As discussed above, the degradable foams disclosed herein can be degraded using a solution comprising either: (a) a source of fluoride anion, or (b) an organic acid having a pKa of less than 2, an inorganic acid having a pKa of less than 2, or a combination thereof and optionally a solvent for the acid. The components of (a) and (b) can be generically described as "degradants." The method of the fourth embodiment includes a step of contacting the degradable foam with a solution comprising one of these degradants; the relative amounts of degradant to foam are as discussed above. In certain embodiments applicable to the first-fourth embodiments disclosed herein, degrading of the foam can be achieved more quickly or more completely by the use of heat. In certain embodiments where the degradant comprises an inorganic acid, the method of the fourth embodiment preferably includes heating. When heating is utilized, it may comprise heating at a temperature above about 40° C., preferably above about 100° C. In certain embodiments applicable to the first-fourth embodiments disclosed herein where heating is utilized, it comprises heating at about 120 to about 250° C., including 120 to 250° C., about 140 to about 200° C., and 140 to 200° C. Generally, the heating temperatures disclosed herein should be understood as the temperature reached by the combined solution and degradable foam such as could be measured by insertion of a thermometer or thermocouple into a portion of the combined solution and foam. In certain embodiments applicable to the first-fourth embodiments disclosed herein, the heating comprises heating for about 0.5 to about 10 hours, including 0.5 to 10 hours, about 0.5 hours to about 5 hours, 0.5 hours to 5 hours, about 0.5 hours to about 3 hours, 0.5 hours to 3 hours, about 0.5 hours to about 2 hours, 0.5 hours to 2 hours, about 0.5 hours to about 1 hour, and 0.5 hours to 1 hour, each time period including but not limited to the foregoing heating temperatures. The heating temperature utilized will be somewhat dependent upon the amount of time available for degradation of the foam; generally, faster degradation will occur at higher temperatures. According to certain embodiments applicable to the first-fourth embodiments disclosed herein, the heating (including at the foregoing temperatures and/or for the foregoing time periods) may be achieved using various methods, non-limiting examples of which include placing the tire containing solution applied to the foam onto a heater, into a heater, under a heater, or applying directed heat to the tire. Non-limiting examples of suitable heaters or heat sources include hot-plate type surfaces, ovens, tire molds, radiant heat sources, and microwaves.

Examples

The following examples illustrate specific and exemplary embodiments and/or certain features of the embodiments of the present disclosure. The examples are provided solely for the purposes of illustration and should not be construed as limiting the present disclosure. Numerous variations over the specific examples are possible without departing from the spirit and scope of the presently disclosed embodiments.

Example 1 (Control)

A sample of polyurethane foam weighing 10 grams was obtained; the sample had been cut from a used pneumatic tire that had been filled with the polyurethane foam and utilized on a vehicle. The polyurethane foam sample was black in color and generally non-compressible by hand-squeezing. The polyurethane foam had been prepared from a combination of a first component (toluene diisocyanate and oil) and a second component (comprising polypropylene oxide, ethylene oxide, and oil) in approximately equal amounts.

Example 2

A degradable foam was prepared according to the following procedure. A first component comprising toluene diisocyanate and oil was utilized. A second component comprising polypropylene oxide and ethylene oxide was provided. Poly(dimethylsiloxane) hydroxyl terminated (Mn=550 grams/mole) was obtained from Sigma-Aldrich Corporation. The poly(dimethylsiloxane) hydroxyl terminated was mixed with the second component in an amount sufficient to comprise 25% by weight of the modified second component (i.e., 1 part poly(dimethylsiloxane) to 3 parts original second component). 1.1 parts of the first component and 1 part of the modified second component were mixed together and allowed to stand wherein foaming began within minutes, thereby forming a degradable foam.

Example 3

The degradable foam prepared in Example 2 was degraded according to the following procedure. A 10 gram sample of the foam was mixed with 1.0 milliliters of tetrabutylammonium fluoride (a source of fluoride anion). The mixture was allowed to stand at room temperature overnight on an orbital mixer. When the mixture was observed the following morning, the foam had degraded into a pourable liquid.

Example 4 (Control)

A 10 gram sample of the foam of Example 1 was subjected to the same procedure described in Example 3 (i.e., mixed with 1.0 milliliters of tetrabutylammonium fluoride under the same conditions). The control foam which lacked any polysiloxane did not degrade as a result of contact with the fluoride anion source, instead retaining its solid and non-compressible form rather than degrading into a pourable liquid.

As shown by the above examples, the incorporation of polysiloxane into a polyurethane foam results in a degradable foam that is capable of degradation into a pourable liquid upon contact with a source of fluoride anion.

This application discloses several numerical range limitations that support any range within the disclosed numerical ranges, even though a precise range limitation may not be stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for degrading degradable foam within a tire containing degradable foam, the tire comprising:
   providing a wheel, a rubber carcass comprising at least a tread portion and a sidewall portion, and optionally a valve stem, and degradable foam comprised of a combination of: (i) at least one di- or polyisocyanate,
(ii) at least one polysiloxane diol, at least one polysiloxane amine, or a combination thereof, and (iii) optionally at least one polyol, the degradable foam contained in the interior of the rubber carcass,
the method comprising contacting the degradable foam with a solution comprising a source of fluoride anion.

2. The method of claim 1, the method comprising contacting the degradable foam with a solution comprising an organic acid having a pKa of less than 2, an inorganic acid having a pKa of less than 2, or a combination thereof and optionally a solvent for the acid.

3. The method of claim 2, wherein at least one of the following is met:
a. the source of fluoride anion comprises hydrogen fluoride, at least one tetraalkylammonium fluoride, cesium fluoride/caesium fluoride, a pyridine salt of hydrogen fluoride, or a combination thereof;
b. the contacting comprises adding the solution through the valve stem of the tire;
c. the contacting comprises adding the solution through the sidewall portion in at least one location;
d. the solution comprises a source of fluoride anion in an amount of about 1% to about 10% on a volume of source of fluoride anion to volume of degradable foam basis; or
e. the solution comprises an organic acid having a pKa of less than 2, an inorganic acid having a pKa of less than 2 or a combination thereof and optionally a solvent for the acid in a total amount of about 1 to about 50% on a volume of solvent to volume of degradable foam basis.

4. The method of claim 3, wherein each of (a)-(c) is met and either (d) or (e) is met.

5. The method according to claim 2, wherein the at least one di- or polyisocyanate is selected from aliphatic, aromatic, araliphatic, and cycloaliphatic.

6. The method according to claim 2, wherein the at least one polyol is selected from alkylene polyols, arylene polyols, polyether polyols, polyester polyols, polycarbonate polyols, polybutadiene polyols, polyamines, polyether polyamines, hydrocarbon polyols, and combinations thereof.

7. The method according to claim 2, wherein (ii) comprises a polysiloxane diol having the formula: HO—$(R^5)_m$Si$(R^1)(R^3)$—[O—Si$(R^2)(R^4)$]$_n$—$(R^6)_o$—OH wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1.

8. The method according to claim 2, wherein (ii) comprises a polysiloxane diamine having the formula: H$_2$N—$(R^5)_m$Si$(R^1)(R^3)$—[O—Si$(R^2)(R^4)$]$_n$—$(R^6)_o$—NH$_2$ wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1.

9. The method according to claim 2, wherein the degradable foam furthers comprise at least one oil.

10. The method according to claim 2, wherein the degradable foam further comprise at least one foaming agent.

11. The method according to claim 2, wherein about 1 to about 50% by weight in total of (ii) and (iii) comprises (ii).

12. The method according to claim 1, wherein (ii) comprises a polysiloxane diol.

13. The method according to claim 1, wherein (ii) comprises polysiloxane diamine.

14. A method for separating a wheel from a tire containing a degradable foam, the method comprising:
providing the wheel and the tire containing the degradable foam, wherein the tire containing the degradable foam includes a rubber carcass comprising at least a tread portion, a sidewall portion, and optionally a valve stem, wherein the degradable foam is comprised of a combination of: (i) at least one di- or polyisocyanate, (ii) at least one polysiloxane diol, at least one polysiloxane amine, or a combination thereof, and (iii) optionally at least one polyol, the degradable foam contained in the interior of the rubber carcass, and
contacting the degradable foam with a solution capable of degrading the foam and allowing separation of the wheel from the tire, the solution comprising either a source of fluoride anion or an organic acid having a pKa of less than 2, an inorganic acid having a pKa of less than 2 or a combination thereof.

15. The method according to claim 14, wherein (ii) comprises polysiloxane diol having the formula: HO—$(R^5)_m$Si$(R^1)(R^3)$—[O—Si$(R^2)(R^4)$]$_n$—$(R^6)_o$—OH wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1.

16. The method according to claim 14, wherein (ii) comprises polysiloxane diamine having the formula: H$_2$N—$(R^5)_m$Si$(R^1)(R^3)$—[O—Si$(R^2)(R^4)$]$_n$—$(R^6)_o$—NH$_2$ wherein $R^1$, $R^2$, $R^3$, $R^4$, $R^5$, and $R^6$ are the same or different and are independently selected from optionally substituted with one or more heteroatoms straight chain, branched or cyclic, saturated or unsaturated hydrocarbon radicals, n is an integer of 2 to 365, m is an integer of 0 or 1, and o is an integer of 0 or 1.

17. The method of claim 14, wherein the solution comprises the source of fluoride anion selected from the group consisting of hydrogen fluoride, at least one tetraalkylammonium fluoride, cesium fluoride/caesium fluoride, a pyridine salt of hydrogen fluoride, or a combination thereof.

18. The method of claim 14, wherein the contacting comprises adding the solution through the valve stem of the tire.

19. The method of claim 14, wherein the solution comprises the source of fluoride anion.

20. The method of claim 14, wherein the solution comprises the organic acid having a pKa of less than 2, the inorganic acid having a pKa of less than 2 or a combination thereof, and optionally further comprises a solvent for the acid.

* * * * *